United States Patent [19]
Davis et al.

[11] Patent Number: 5,181,138
[45] Date of Patent: Jan. 19, 1993

[54] FAST ACQUISITION OPTICAL FREQUENCY LOCKED LOOP

[75] Inventors: Dennis W. Davis, Boca Raton; Stanley Scalise, Palm Beach Gardens, both of Fla.

[73] Assignee: United Technologies Corporation, Hartford, Conn.

[21] Appl. No.: 829,793

[22] Filed: Jan. 31, 1992

[51] Int. Cl.$^5$ .................. G02B 26/00; H04B 10/06
[52] U.S. Cl. .................................. 359/239; 359/191; 342/100
[58] Field of Search ............... 359/239, 307, 187, 191; 342/98, 100, 103; 369/106; 356/349

[56] References Cited

U.S. PATENT DOCUMENTS

| | | | |
|---|---|---|---|
| 3,975,628 | 7/1976 | Graves et al. | 359/191 |
| 5,046,140 | 9/1991 | Yamazaki | 359/191 |

OTHER PUBLICATIONS

Lowney et al., "Frequency Acquisition and Tracking for Optical Heterodyne Communication Systems," J. Lightwave Tech., vol. LT-S, #4.
Scholtz et al., "Realization of a 10-um Homodyne Receiver," J. Lightwave Tech., vol. LT-S, #4, Apr. 1987.

Primary Examiner—Ian J. Lobo

[57] ABSTRACT

A control loop for matching the frequency of an incoming electromagnetic beam controls a local oscillator with two feedback loops including a coarse loop employing an optical frequency shifted beam to generate a coarse control voltage in nanoseconds and a fine loop employing a fast lock loop filter to generate a fine control signal that provides loop convergence on the order of a microsecond.

10 Claims, 1 Drawing Sheet

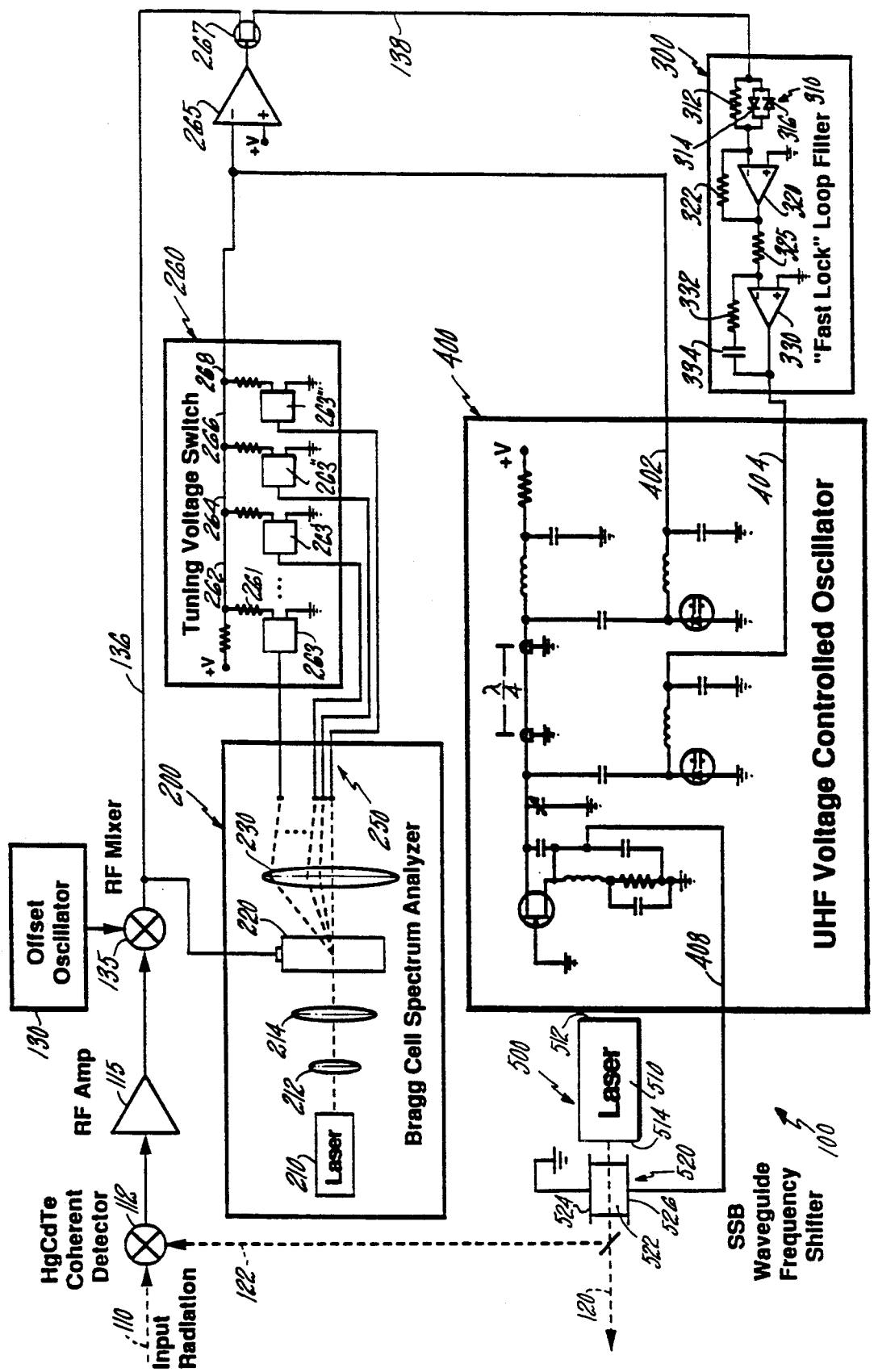

FAST ACQUISITION OPTICAL FREQUENCY LOCKED LOOP

CROSS REFERENCE TO RELATED APPLICATIONS

This application is related to the subject matter disclosed and claimed in copending U.S. Ser. No. 07/829800 entitled Lidar Countermeasure by Dennis W. Davis, William F. Conley and Donald J. Link filed on even date herewith and assigned to the same assignee herein incorporated by reference.

TECHNICAL FIELD

The field of the invention is that of controlling the frequency of an optical source to match the frequency of another source.

BACKGROUND ART

Laser warning receivers and high data rate optical communication systems require local oscillators which can rapidly track the frequency of received radiation. Situations occur where significant uncertainty exists regarding the optical carrier frequency of the anticipated signal. Such uncertainty can result from doppler shifts in the radiation transmitted from satellites, missiles, etc., or in the case of uncooperative transmitters, transmitters tuned to differing operating frequencies. A common approach to tracking the frequency of received radiation employs a phase-locked-loop. Recent optical implementations of this widely used electronic concept, such as A. Scholtz, W. Leeb, R. Flatscher, and H. Philips, "Realization of a 10μm Homodyne Receiver," Journal of Lightwave Tech., Vol. LT-5, No. 4, Apr. 1987 and S. Lowney and D. Marquis., "Frequency Acquisition and Tracking for Optical Heterodyne Communication Systems," Journal of Lightwave Tech., Vol. LT-5, No. 4, Apr. 1987., exploit an optical voltage controlled oscillator (OVCO), to provide frequency tunable laser output in a feedback control loop with various kinds of rf frequency discrimination to compare the OVCO frequency with that of the received radiation. These implementations achieve frequency lock in times on the order of hundreds of microseconds. The presently disclosed approach can acquire frequency lock at least two orders of magnitude faster with a reduced amount of hardware.

DISCLOSURE OF INVENTION

The invention relates to a system for controlling an optical frequency to match an input frequency, in which a beat frequency passes into two control loops, both of which affect the output frequency. A fast control loop uses an optical technique for quickly generating a coarse contact signal, while a slower control loop uses electronic components to generate a more accurate control signal. Both loops are input to a VCO that frequency shifts the output of a stable optical source. Both loops merge in a voltage controlled oscillator that produces an output frequency that shifts the frequency of a local oscillator.

Other features and advantages will be apparent from the specification and claims and from the accompanying drawings which illustrate an embodiment of the invention.

BRIEF DESCRIPTION OF DRAWINGS

The sole FIGURE illustrates schematically an embodiment of the invention.

BEST MODE OF CARRYING OUT THE INVENTION

In FIG. 1, a partially schematic, partially functional diagram of the presently disclosed invention, received optical radiation entering on beam 110 at the upper left, is detected by heterodyne means on a mercury cadmium telluride photodetector 112. The loop radiation or loop optical signal from a local oscillator is shown fed from below along beam 122. The output radio-frequency beat signal having a frequency which is the difference between that of the received radiation and shifted output radiation is fed from detector 112 to amplifier 115 and further to an rf mixer 135. An offset oscillator 130 operates at a frequency high enough to ensure that the frequency of the output from this second mixer 135 is at a convenient frequency (e.g., not at baseband given the aforementioned received radiation frequency uncertainty). A portion of this mixer output is input to a Bragg cell spectrum analyzer denoted generally by the numeral 200 with a bandwidth of a gigahertz and a spectral resolution or "bin width" of several hundred kilohertz. The output from mixer 135 sets up a temporary grating in electro-optic crystal 220 that depicts a portion of the beam from laser 210 to one of a set of detectors 250. These detectors are sized and placed to give the desired frequency resolution, which for this application is on the order of several hundred kilohertz. Energy appearing in one of the frequency bins of the analyzer will cause a corresponding tuning voltage to be connected to a voltage controlled oscillator (VCO) 400 through a FET switch bank 260.

This VCO is tunable over an rf band on the order of 1 gigahertz, which is large enough to accommodate the offset oscillator and uncertainty in the received radiation frequency 4. The frequency of the local waveguide laser 510 in source 500 is shifted by the VCO frequency using an external single sideband frequency shifter 525 which comprises a thin (10-25 microns) electro-optic crystal such as GaAs contained between two microwave stripline electrodes to form a TW waveguide configuration as illustrated in Izutsu et al, "Integrated Optical SSB Modulator/Frequency Shifter", IEEE Journal of Quantum Electronics, Vol. QE-17, No. 11, Nov. 1981. The output of the frequency shifter is now coarsely tuned on the first pass through the loop to within several hundred kilohertz of the received radiation within a time period of a few tens of nanoseconds.

FET switch bank 260 composes a set of resisters 261, 261', etc., controlled by units 263, 263', etc. Units 263 illustratively compose a flip-flop or other latching unit controlling a current path connecting resistor 261 to ground. One of units 263 will be energized on the first pass through the loop, after which the connection between analyzer 200 and switch bank 260 is inhibited by conventional circuits not shown, so that the signal on line 402 does not change as the signal out of mixer 135 reflects loop convergence.

The voltage comparator 265 of the upper right, having incorporated a time delay to allow the coarse tuning of the laser to transpire, now causes a FET switch 267 to close a fine tuning loop with the second mixer output connected to a "fast lock" loop filter 300. The output of the loop filter provides a fine tuning error voltage to the VCO that operates over a time scale on the order of a microsecond, compared with prior art time scales of the order of a millisecond.

Referring now to analyzer 200, the operation is that of deflection of a beam from laser 210 by acousto-optic cell 220. Lenses 212, 214 and 230 operate in conventional fashion to expand the beam and focus it onto the set of optical detectors 250. When the system first receives incident radiation. one of detectors 250 will be excited, depending on the frequency difference between the incoming beam and the beam from loop laser 510. Each of detectors 250 controls a different transistor 262, etc., to apply a voltage to VCO 400. The resistors 261, etc., will be set to give a set of different voltages. For $CO_2$ radiation and conventional values of acousto-optic crystals, the bandwidth of the spectrum analyzer will be about 1 gigahertz and the resolution will be about several hundred kilohertz. Those skilled in the art will readily be able to adapt this embodiment for other wavelength ranges or their own resolution applications. In applications using other than CO2 lasers, the only changes to be made in the present configuration involve use of a different optical heterodyne detector, fixed frequency local laser and corresponding frequency shifter. For sources at shorter wavelengths, each of these components is available.

VCO 400 is a transmission line VCO such as that shown in V. Manassewitsch, "Frequency Synthesizers—Theory and Design", John Wiley & Sons, 1976, in which a microstrip delay line having a delay of one quarter of the free-running wavelength of the oscillator is used.

An outer loop having a smaller dynamic range and slower response time is controlled by comparator 265 and transistor 267, so that the outer loop will only open after the inner loop has had time to engage the VCO. Loop filter 300, operating as described in B. Glance, "New Phase-Lock Circuit Providing Very Fast Acquisition Time," IEEE Trans. on Microwave Theory and Techniques, Vol. MTT-33, No. 9, Sept. 1985, uses diodes 314 and 316 to bypass resistor 312 and create large loop filter gain for large amplitude error signals by shorting resistor 312. Op amps 320 and 330 with their associated components operate conventionally as a phase lock loop filter to generate a slowly varying output signal that depends on the rf beat frequency of the loop.

Preferably, the components are sized that the output of filter 300 will move the frequency of beam 122 by one bin of Bragg analyzer 200, so that filter 300 functions as a vernier to adjust the frequency within one "binwidth" of analyzer 200.

In source 500, laser 510 generates a stable reference beam that is frequency-shifted to match the input. As described above, the output signal from VCO 400 is applied on line 408 to crystal 522, from which M. Izutsu, S. Shikama, and T. Sueta, "Integrated Optical SSB Modulator/Frequency Shifter" IEEE Journal of Quantum Electronics, Vol. OE-1 7, No. 11, Nov. 1981 and "Design Studies of 10 Micron Laser Radar Modulators," United Technologies Research Center Final Technical Report R87-927477. One single sideband is selected to travel on path 122 back to mixer 112. The remainder of the output beam travels as beam 120 for whatever purpose is required.

Those skilled in the art will readily appreciate that the invention can be applied to many different lasers, such as dye lasers and diode lasers. The incoming radiation need not be travelling in free space, but may be in an optical fiber. The range of possible output wavelengths may be expanded by placing two or more output lasers 500, 500', etc., in parallel, each tuned to a different fixed wavelength. The invention could also be applied to microwave values with the substitution of a microwave transmitter for output laser 500 and the elimination of detector 112 and 115. The feedback is then directed into mixer 135. Offset oscillator 130 will not be necessary for all applications.

It should be understood that the invention is not limited to the particular embodiments shown and described herein, but that various changes and modifications may be made without departing from the spirit and scope of this novel concept as defined by the following claims.

We claim:

1. An optical system incorporating a feedback control loop for controlling an optical output wavelength of an optical output beam to match an incoming frequency and wavelength of an incoming optical signal having an incoming signal wavelength comprising:

signal comparison means for comparing said incoming optical signal with a loop optical signal to form an rf beat signal;

a voltage controlled oscillator for generating an rf control signal, having an rf control frequency, that controls said loop optical signal in frequency;

coarse frequency control means, connected to said signal comparison means, for generating a coarse tuning control signal by applying said rf beat signal to an acousto-optic modulator that deflects a beam from a local optical source to strike one of a plurality of optical detectors disposed transversely from a local source axis, whereby that one of said plurality of optical detectors receiving deflected radiation passes a signal to a voltage switch that generates a tuning voltage having one of a predetermined set of tuning voltage values and applies said tuning voltage as said coarse tuning control signal to a first input of said voltage controlled oscillator;

fine tuning control means, connected to said signal comparison means and to said voltage switch, for generating and applying a fine tuning control signal to a second input of said voltage controlled oscillator, including a loop filter for filtering said beat frequency to generate therefrom said fine tuning control signal and applying said fine tuning control signal to a second input of said voltage controlled oscillator after a relative delay after said tuning voltage;

an output frequency shifting unit, connected to an output of said voltage controlled oscillator and to a local optical source, for frequency modulating a loop optical beam, having a loop frequency, passing therethrough to generate an optical output beam having said output frequency; and optical feedback means disposed to intercept said optical output beam for transporting a fraction of said optical output beam to said signal comparison means, whereby said loop operates to drive said output wavelength to match said incoming signal wavelength.

2. A system according to claim 1, in which said signal comparison means comprises an optical mixer responsive to said output optical beam and to said incoming optical beam that generates a first rf beat signal and an rf mixer responsive to said first rf beat signal and to an offset rf signal source to generate said rf beat signal having a predetermined offset value.

3. A system according to claim 1, in which said coarse frequency control means contains latching means for maintaining said coarse tuning control signal at an initial value as said feedback control loop converges to a final value, whereby said coarse tuning voltage maintains said initial value adapted to compensate for a frequency difference between said incoming optical signal and said local optical source.

4. A system according to claim 1, in which said local optical source transmits a local beam having a local frequency to an acousto-optical unit that shifts said local frequency by an amount equal to said rf control frequency and selects a single sideband of a frequency-shifted local beam as said optical output beam.

5. A system incorporating a feedback control loop for controlling an output wavelength of an electromagnetic output beam to match an incoming frequency and wavelength of an incoming electromagnetic signal having an incoming signal wavelength comprising:

signal comparison means for comparing said incoming electromagnetic signal with a loop electromagnetic signal to form an rf beat signal;

a voltage controlled oscillator for generating an rf control signal, having an rf control frequency, that controls said loop electromagnetic signal in frequency;

coarse frequency control means, connected to said signal comparison means, for generating a coarse tuning control signal by applying said rf beat signal to an acousto-optic modulator that deflects a beam from a local electromagnetic source to strike one of a plurality of optical detectors disposed transversely from a local source axis, whereby that one of said plurality of optical detectors receiving deflected radiation passes a signal to a voltage switch that generates a tuning voltage having one of a predetermined set of tuning voltage values and applies said tuning voltage as said coarse tuning control signal to a first input of said voltage controlled oscillator;

fine tuning control means, connected to said signal comparison means and to said voltage switch, for generating and applying a fine tuning control signal to a second input of said voltage controlled oscillator, including a loop filter for filtering said beat frequency to generate therefrom said fine tuning control signal and applying said fine tuning control signal to a second input of said voltage controlled oscillator after a relative delay after said tuning voltage;

an output frequency shifting unit, connected to an output of said voltage controlled oscillator and to a local electromagnetic source, for frequency modulating a loop electromagnetic beam, having a loop frequency, passing therethrough to generate an electromagnetic output beam having said output frequency; and electromagnetic feedback means disposed to intercept said electromagnetic output beam for transporting a fraction of said electromagnetic output beam to said signal comparison means, whereby said loop operates to drive said output wavelength to match said incoming signal wavelength.

6. A system according to claim 5, in which said coarse frequency control means contains latching means for maintaining said coarse tuning control signal at an initial value as said feedback control loop converges to a final value, whereby said coarse tuning voltage maintains said initial value adapted to compensate for a frequency difference between said incoming optical signal and said local optical source.

7. A system according to claim 5, in which said local optical source transmits a local beam having a local frequency to an acousto-optical unit that shifts said local frequency by an amount equal to said rf control frequency and selects a single sideband of a frequency-shifted local beam as said optical output beam.

8. A system according to claim 5, in which said local electromagnetic source operates in the microwave portion of the electromagnetic spectrum.

9. A system according to claim 8, in which said coarse frequency control means contains latching means for maintaining said coarse tuning control signal at an initial value as said feedback control loop converges to a final value, whereby said coarse tuning voltage maintains said initial value adapted to compensate for a frequency difference between said incoming optical signal and said local optical source.

10. A system according to claim 8, in which said local optical source transmits a local beam having a local frequency to an acousto-optical unit that shifts said local frequency by an amount equal to said rf control frequency and selects a single sideband of a frequency-shifted local beam as said optical output beam.

* * * * *